US012475828B2

(12) United States Patent
Huang et al.

(10) Patent No.: US 12,475,828 B2
(45) Date of Patent: Nov. 18, 2025

(54) DISPLAY METHOD, DISPLAY PANEL AND READABLE STORAGE MEDIA

(71) Applicant: HKC CORPORATION LIMITED, Shenzhen (CN)

(72) Inventors: Peidi Huang, Shenzhen (CN); Wei Fu, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 78 days.

(21) Appl. No.: 18/649,029

(22) Filed: Apr. 29, 2024

(65) Prior Publication Data

US 2024/0379041 A1 Nov. 14, 2024

(30) Foreign Application Priority Data

May 12, 2023 (CN) ........................ 202310530251.X

(51) Int. Cl.
*G09G 3/20* (2006.01)
*G09G 3/32* (2016.01)

(52) U.S. Cl.
CPC ............ *G09G 3/2074* (2013.01); *G09G 3/32* (2013.01); *G09G 2310/027* (2013.01); *G09G 2320/0242* (2013.01); *G09G 2320/0271* (2013.01); *G09G 2330/021* (2013.01)

(58) Field of Classification Search
CPC .. G09G 3/2074; G09G 3/32; G09G 2310/027; G09G 2320/0242; G09G 2320/0271; G09G 2330/021
See application file for complete search history.

(56) References Cited

U.S. PATENT DOCUMENTS

| | | | | |
|---|---|---|---|---|
| 11,955,055 B1 * | 4/2024 | Huang | G09G 3/32 |
| 2013/0169619 A1 * | 7/2013 | Jeong | G09G 5/001 345/212 |
| 2020/0105213 A1 | 4/2020 | Song | |
| 2021/0312856 A1 * | 10/2021 | Jeong | G09G 5/18 |
| 2025/0140172 A1 * | 5/2025 | Jung | G09G 3/32 |

FOREIGN PATENT DOCUMENTS

| | | |
|---|---|---|
| CN | 104795015 A | 7/2015 |
| CN | 111083854 A | 4/2020 |
| CN | 113506537 A | 10/2021 |
| CN | 114582284 A | 6/2022 |
| CN | 114783358 A | 7/2022 |
| CN | 116013204 A | 4/2023 |
| CN | 116072060 A | 5/2023 |

* cited by examiner

*Primary Examiner* — Andrew Sasinowski
(74) *Attorney, Agent, or Firm* — Maier & Maier, PLLC

(57) ABSTRACT

A display method, a display panel, and a non-transitory computer readable storage medium, relating to the field of display technology. The method includes: determining whether a pixel row to be displayed includes at least one sub-pixel with a grayscale value lower than a predetermined threshold; increasing, if yes, a voltage of a data line on which a light-emitting element is located when displaying the pixel row, and the light-emitting element being configured for displaying a red sub-pixel of the at least one sub-pixel. It is only required to increase the voltage of the data line to solve the problem of color deviation, and no driver chip with high control precision is needed in the display panel, so the cost of the display panel can be reduced.

20 Claims, 4 Drawing Sheets

DISPLAY METHOD, DISPLAY PANEL AND READABLE STORAGE MEDIA

CROSS-REFERENCE TO RELATED APPLICATIONS

The present application claims the benefit of Chinese patent application No. 202310530251. X filed on May 12, 2023, titled "Display Method, Display Panel and Readable Storage Media", the entire contents of which are incorporated herein by reference.

TECHNICAL FIELD

The present application relates to the field of display technology, and in particular, to a display method, a display panel, and a readable storage media.

BACKGROUND

With the continuous progress in display technology, the spacing between adjacent light-emitting elements in the display panel is becoming smaller and smaller. As the spacing decreases, the parasitic capacitance on the data line where the light-emitting element is located becomes larger, and the larger the parasitic capacitance is, the greater the impact on the light-emitting element is.

Light-emitting elements of different colors have different material properties, and the current changes in the light-emitting elements of different colors vary when affected by parasitic capacitance. During the display of a low-grayscale picture, the current in the red light-emitting element is subjected to less influence by the parasitic capacitance, so the brightness of the red light-emitting element will be significantly stronger than the brightness of the light-emitting elements of other colors, which causes the picture displayed by the display panel reddish, resulting in a low-grayscale color deviation.

In the existing technology, the problem of low-grayscale color deviation is usually solved by improving the control precision of the driver chip. When the control precision of the driver chip is high, the currents in the light-emitting elements of different colors can be controlled to be similar to or consistent, so that the brightness of the light-emitting elements of different colors can be brought similar or be maintained, so as to solve or alleviate the problem of color deviation. However, the cost increases as the control precision of the driver chip enhances, and in solving the problem of low-grayscale color deviation by means of improving the control precision of the driver chip, the cost of the display panel is increased. Therefore, there remains a demand for a low-cost method capable of solving the problem of low-grayscale color deviation.

SUMMARY

Embodiments of the present application provide a display method, a display panel, and a readable storage media, aiming to solve the increased cost of display panels due to color deviation.

In a first aspect, the present application provides a display method, including:

- determining whether a pixel row to be displayed includes at least one sub-pixel with a grayscale value below a predetermined threshold; and
- increasing, if yes, a voltage of a data line on which a light-emitting element is located when displaying the pixel row, the light-emitting element is configured to display a red sub-pixel of the at least one sub-pixel.

Optionally, the method further includes: increasing a duty cycle of a turn-on voltage and/or increasing a voltage value of the turn-on voltage, the turn-on voltage is a turn-on voltage inputted to a scan line where the light-emitting element is located.

Optionally, the step of increasing a voltage of a data line where a light-emitting element is located includes: determining a first voltage increment based on the grayscale value of the at least one sub-pixel; and increasing the voltage of the data line where the light-emitting element is located according to the first voltage increment.

Optionally, the step of increasing a duty cycle of a turn-on voltage includes: determining a duty cycle increment based on the grayscale value of the at least one sub-pixel; and increasing the duty cycle of the turn-on voltage according to the duty cycle increment.

Optionally, the step of increasing a voltage value of the turn-on voltage includes: determining a second voltage increment based on the grayscale value of the at least one sub-pixel; and increasing the voltage value of the turn-on voltage according to the second voltage increment.

Optionally, the pixel row is a row of pixels in a to-be-displayed image, and before the step of determining whether a pixel row to be displayed includes at least one sub-pixel with a grayscale value below a predetermined threshold, the method further includes:

- counting sub-pixels with a grayscale value below the predetermined threshold in the to-be-displayed image to obtain a statistical number; and
- determining that a proportion of the statistical number in the number of total sub-pixels in the to-be-displayed image is greater than a predetermined proportion.

Optionally, the step of counting sub-pixels with a grayscale value below the predetermined threshold in the to-be-displayed image to obtain a statistical number includes:

- determining at least one low grayscale region from the to-be-displayed image, the low grayscale region consists of a plurality of consecutive sub-pixels having a grayscale value below the predetermined threshold, the number of the plurality of consecutive sub-pixels is no less than a predetermined number; and
- determining the statistical number based on the number of total sub-pixels included in each low grayscale region.

In a second aspect, an embodiment of the present application provides a display panel, including:

- a first determination module configured for determining whether a pixel row to be displayed includes at least one sub-pixel with a grayscale value below a predetermined threshold; and
- an amplifying module configured for, if yes, increasing a voltage of a data line on which a light-emitting element is located during displaying the pixel row, the light-emitting element is configured to display a red sub-pixel of the at least one sub-pixel.

Optionally, the amplifying module is further configured for increasing a duty cycle of a turn-on voltage and/or a voltage value of the turn-on voltage, the turn-on voltage is a turn-on voltage inputted to a scan line on which the light-emitting element is located.

Optionally, the amplifying module includes:

- a determination unit configured for determining a first voltage increment based on the grayscale value of the at least one sub-pixel; and an amplifying unit configured for increasing the voltage of the data line on which the light-emitting element is located according to the first voltage increment.

Optionally, the amplifying module includes:

a determination unit configured for determining a duty cycle increment based on the grayscale value of the at least one sub-pixel; and an amplifying unit configured for increasing the duty cycle of the turn-on voltage according to the duty cycle increment.

Optionally, the amplifying module includes:

a determination unit configured for determining a second voltage increment based on the grayscale value of the at least one sub-pixel; and an amplifying unit configured for increasing the voltage value of the turn-on voltage according to the second voltage increment.

Optionally, the pixel row is a row of pixels in a to-be-displayed image, and the device further includes:

a statistics module configured for counting sub-pixels in the to-be-displayed image having a grayscale value below a predetermined threshold to obtain a statistical number; and a second determination module configured for determining that a proportion of the statistical number in the number of sub-pixels in the to-be-displayed image is greater than a predetermined proportion.

Optionally, the statistics module is specifically configured for determining at least one low grayscale region from the to-be-displayed image, the low grayscale region consists of a plurality of consecutive sub-pixels having a grayscale value lower than the predetermined threshold, the number of the plurality of consecutive sub-pixels is no less than a predetermined number; and determining the statistical number based on the number of sub-pixels included in each low grayscale region.

In a third aspect, an embodiment of the present application provides a readable storage medium, the readable storage medium stores a computer program, the computer program when executed by a processor implements the method as described in the first aspect.

The advantageous effect of the embodiments of the present application compared with the existing technology is that only the voltage of the data line needs to be increased in solving the problem of color deviation, without the setup of a driver chip with high control precision in the display panel, so the cost of the display panel can be reduced.

BRIEF DESCRIPTION OF THE DRAWINGS

In order to more clearly illustrate the technical proposals in embodiments of the present application, accompanying drawings that are used in the description of the embodiments or exemplary existing technologies are briefly introduced hereinbelow. Obviously, the drawings in the following description are merely some embodiments of the present application. For those skilled in the art, other drawings can also be obtained according to these drawings without any creative effort.

DETAILED DESCRIPTION OF THE EMBODIMENTS

In the following description, specific details such as particular system structures, techniques, and the like are presented for purposes of illustration and not for purposes of limitation, in order to provide a thorough understanding of embodiments of the present application. However, it should be clear to those skilled in the art that the present application can be realized in other embodiments without these specific details. In other cases, detailed descriptions of well-known systems, devices, circuits, and methods are omitted so that unnecessary details do not hinder the description of the present application.

It should be understood that, when used in the description and the appended claims of this application, the term "includes" indicates the presence of the described features, integrals, steps, operations, elements, and/or components, but does not preclude the presence or addition of one or more other features, integrals, steps, operations, elements, components, and/or collections thereof.

It should also be understood that the term "and/or" as used in the description and the appended claims of this application refers to and includes any combination and all possible combinations of one or more of the items listed in the association.

As used in the description and the appended claims of this application, the term "if" can be interpreted contextually as "when" or "once" or "in response to determining" or "in response to detecting". Similarly, the phrases "if determined" or "if [the described condition or event] is detected" may be interpreted contextually as "once determined" or "in response to determining" or "once detecting [the described condition or event]" or "in response to detecting [the described condition or event]".

Furthermore, in the description and the appended claims of this application, the terms "first", "second", "third" and the like are used only to distinguish the description and are not to be understood as indicating or implying relative importance.

References to "an embodiment" or "some embodiments" and the like described in this description imply that one or more embodiments of the present application include a particular feature, structure, or characteristic described in combination with that embodiment. As a result, the phrases "in one embodiment", "in some embodiments", "in other embodiments", and "in some other embodiments" appearing at various points in this description do not necessarily all refer to the same embodiment, but rather mean "one or more, but not all, embodiments", unless otherwise specifically emphasized. The terms "including", "comprising", "having", and variations thereof mean "including but not limited to", unless otherwise specifically emphasized.

Figure 1:
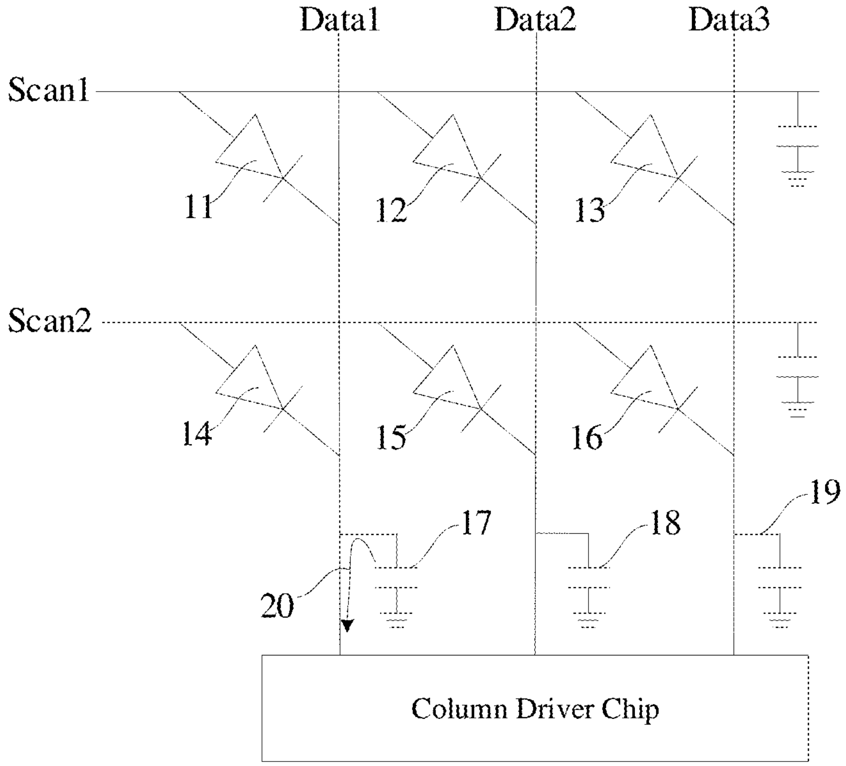
FIG. 1 is a schematic diagram of a circuit principle of a partial display panel provided by embodiments of the present application.

FIG. 1 is a schematic diagram of a circuit principle of a partial display panel provided by embodiments of the present application. The display panel includes a light-emitting element array, in which three consecutive light-emitting elements of different colors in each row of light-emitting elements form a display unit, and light-emitting elements in the same column exhibit the same color. As shown in FIG. 1, a light-emitting element 11 and a light-emitting element 14 are red light-emitting elements, a light-emitting element 12 and a light-emitting element 15 are green light-emitting elements, and a light-emitting element 13 and a light-emitting element 16 are blue light-emitting elements, the light-emitting element 11, the light-emitting element 12, and the light-emitting element 13 constitute a display unit, and the light-emitting element 14, the light-emitting element 15, and the light-emitting element 16 constitute another display unit.

As shown in FIG. 1, the light-emitting element array also includes scan lines and data lines, with an anode of the light-emitting elements in each row is connected to a corresponding scan line, and a cathode of the light-emitting elements in each column is connected to a corresponding data line. The symbols Scan1 and Scan2 denote the scan lines in the light-emitting element array, and the symbols Data1, Data2 and Data3 denote the data lines in the light-emitting element array.

The display panel also includes a column driver chip (driver integrated circuit chip) and a row driver chip (not shown), the row driver chip is connected to each scan line for inputting a switching signal (also referred to as a row scanning signal) to the anode of each row of light-emitting elements, and the column driver chip is connected to each data line for inputting a reference signal to the cathode of each column of light-emitting elements (also referred to as a reference voltage). The display panel may also include a timing controller (TCON) and other components, which are not limited by the present embodiment.

The light-emitting element is for example a light-emitting diode (LED) or a sub-millimeter light-emitting diode, the sub-millimeter light-emitting diode is also referred to as a miniature light-emitting diode, and the light-emitting element may include, but is not limited to, the above examples.

In the process of displaying a frame of an image via the display panel, each display unit displays one pixel in the image. The image is, for example, an image in red-green-blue (RGB) mode, and each pixel in the image includes three sub-pixels, namely a red sub-pixel (also referred to as a red channel), a green sub-pixel (also referred to as a green channel), and a blue sub-pixel (also referred to as a blue channel).

Each light-emitting element is used to display one sub-pixel in the corresponding pixel, respectively. For example, the display unit consisting of the light-emitting element 11, the light-emitting element 12, and the light-emitting element 13 is configured for displaying one corresponding pixel, in which the light-emitting element 11 is configured for displaying a red sub-pixel in that pixel, the light-emitting element 12 is configured for displaying a green sub-pixel in that pixel, and the light-emitting element 13 is configured for displaying a blue sub-pixel in that pixel.

Figure 2:
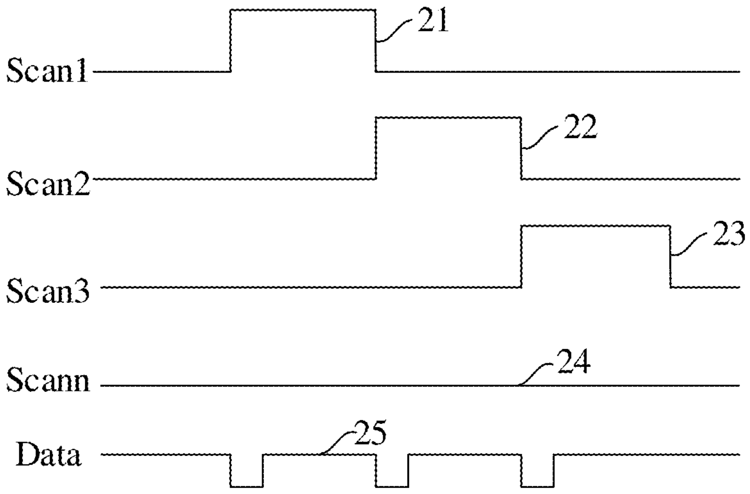
FIG. 2 is a schematic diagram of signal changes in a display panel provided by an embodiment of the present application.

FIG. 2 is a schematic diagram of signal changes in a display panel provided by an embodiment of the present application. When displaying an image, the display panel usually displays pixels in the image in rows, and a row of pixels in the image is called a pixel row. As shown in FIG. 2, during displaying the image, the row driver chip inputs a switching signal 21 to the scan line Scan1, a switching signal 22 to the scan line Scan2, a switching signal 23 to the scan line Scan3, and a switching signal 24 to other scan lines Scann, and the column driver chip inputs a reference signal 25 to the data lines.

Exemplarily, during displaying an image, firstly the voltage of the switch signal 21 reaches a turn-on voltage (the turn-on voltage is a high-level voltage of the switch signal, for example, 5 V), and the voltage of the reference signal 25 is driven down to 0 V by the column driver chip, at which point the light-emitting elements in the 1st row shown in FIG. 1 are conducted to emit light. Each display unit of the light-emitting elements in the 1st row displays one pixel in the 1st pixel row in the image, so as to display the 1st pixel row. When the voltage of the switch signal 21 drops to a blanking voltage (the blanking voltage is a low-level voltage of the switch signal, for example, 3 V), and the voltage of the reference signal 25 rises to 5 V, the light-emitting elements in the 1st row reverse to cut off and do not emit light.

Next, the voltage of the switch signal 22 reaches a turn-on voltage and the voltage of the reference signal 25 is driven down to 0 V, at which point light-emitting elements in the 2nd row are conducted to emit light. Each display unit of the light-emitting elements in the 2nd row displays one pixel in the 2nd pixel row in the image, so as to display the 2nd pixel row. When the voltage of the switch signal 22 drops to the blanking voltage and the voltage of the reference signal 25 rises to 5 V, the light-emitting elements in the 2nd row reverse to cut off and do not emit light. Each pixel row in the image is displayed in the same manner.

As shown in FIG. 1, there is parasitic capacitance on each of the data lines in the light-emitting element array. Data line Data1 has parasitic capacitance 17, data line Data2 has parasitic capacitance 18, and data line Data3 has parasitic capacitance 19. During the reverse cutoff of the light-emitting element, the voltage on the data line charges the parasitic capacitance. When the light-emitting element is conducted to emit light, the parasitic capacitance discharges to the data line (the arrow 20 indicates the discharge path of the parasitic capacitance 17), which has an effect on the current in the light-emitting element connected to the data line. In each display unit, the red light-emitting element, the green light-emitting element, and the blue light-emitting element have different material properties, and the three types of light-emitting elements show different current changes when affected by the parasitic capacitance.

Figure 3:
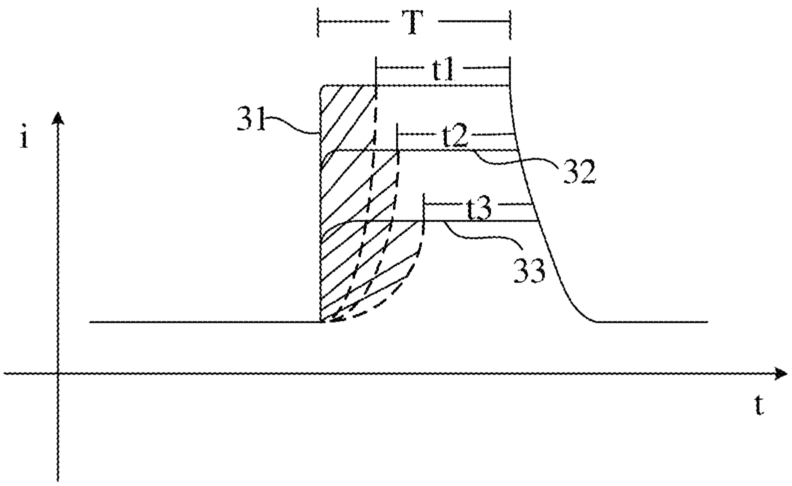
FIG. 3 is a schematic diagram of current changes in a light-emitting element provided by an embodiment of the present application.

FIG. 3 is a schematic diagram of the current change in a light-emitting element provided by an embodiment of the present application. In FIG. 3, the horizontal axis indicates time, the vertical axis indicates current, and curve 31 shows the curve of the current change in the red light-emitting element in the display unit, curve 32 the curve of the current change in the green light-emitting element in the display unit, and curve 33 shows the curve of the current change in the blue light-emitting element in the display unit.

As shown in FIG. 3, the shaded part indicates the effect of parasitic capacitance, the duty cycle of the turn-on voltage in the switch signal is T (as the duty cycle becomes larger, the holding time of the turn-on voltage and the conduction time of the light-emitting element increase), and after being affected by parasitic capacitance, the conduction time of the red light-emitting element is shortened from T to t1, the conduction time of the green light-emitting element is shortened from T to t2, and the conduction time of the blue light-emitting element is shortened from T to t3. The longer the conduction time of a light-emitting element, the greater the brightness, and since the conduction time of the red light-emitting element is longer than that of the green light-emitting element and the blue light-emitting element, the red light emitted by the red light-emitting element has a greater brightness, the green light emitted by the green light-emitting element has a lower brightness, and the blue light emitted by the blue element also has a lower brightness, which makes the brightness of the red light-emitting element is greater than that of the green light-emitting element and the blue light-emitting element.

When the grayscale values of a plurality of sub-pixels within a region in the image are all relatively low, this region has a lower brightness in the display panel, and at this point, the corresponding red light-emitting element in this region has higher brightness, and the blue light-emitting element and the green light-emitting element have lower brightness, which will cause the corresponding region in the image displayed by the display panel to be reddish, and problems of low-grayscale color deviation will occur.

It should be noted that when the grayscale values of a plurality of sub-pixels within a region are all relatively high, the region has a higher brightness in the display panel, and although the parasitic capacitance causes the brightness of the red light-emitting element to be greater than that of the blue light-emitting element and the green light-emitting element, the human eye is usually not able to perceive the existence of the color deviation.

In the existing technology, the problem of low-grayscale color deviation is usually solved by improving the control precision of the driver chip. When the control precision of the driver chip is high, the current in the light-emitting elements of different colors can be controlled to be similar or consistent, so that the brightness of the light-emitting elements of different colors is similar or consistent, and the problem of color deviation can be alleviated or solved. However, increasing the control precision of the driver chip results in a higher cost, so solving the problem of low-grayscale color deviation by improving the control precision of the driver chip increases the cost of the display panel.

In order to solve the above technical problem, embodiments of the present application provide a display method in which, in the process of displaying pixels in an image, if it is determined that a pixel row includes at least one sub-pixel having a grayscale value lower than a predetermined threshold value, a voltage of a data line used to display a red sub-pixel is increased when the pixel row is displayed.

As shown in FIG. 1, when the voltage of the data line where the red sub-pixel is located is increased, the voltage difference between the anode and the cathode of the red light-emitting element decreases, and the brightness of the red light-emitting element is reduced, so that the brightness of the red light-emitting element is close to or consistent with that of the green light-emitting element and the blue light-emitting element, and thus the problem of color deviation can be alleviated or solved. It is only necessary to increase the voltage of the data line in solving the problem of color deviation, and it is not necessary to provide a driver chip with high control precision in the display panel, so the cost of the display panel can be reduced.

Figure 4:
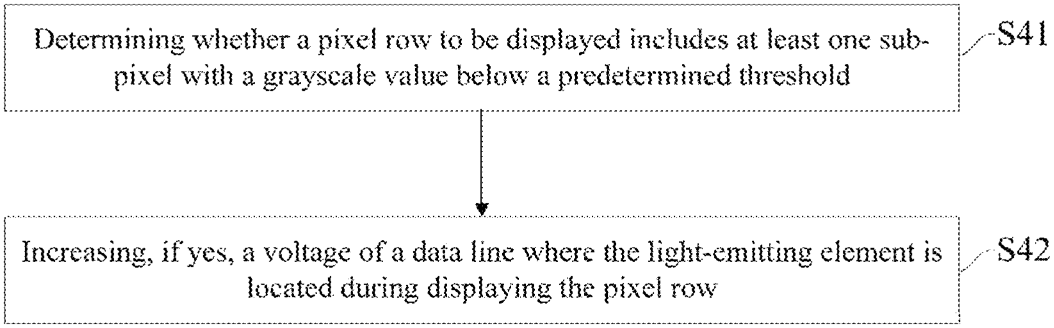
FIG. 4 is a flowchart of steps of a display method provided by an embodiment of the present application.

FIG. 4 illustrates a flowchart of steps of a display method provided in an embodiment of the present application. The method may be performed by a display panel, as shown in FIG. 4, the method may include steps S41 to S42.

S41: determining whether a pixel row to be displayed includes at least one sub-pixel with a grayscale value below a predetermined threshold.

The sub-pixel with a grayscale value below the predetermined threshold may be referred to as a low grayscale sub-pixel, and the value of the predetermined threshold may be set specifically according to the characteristics of the light-emitting elements in the display panel.

In some embodiments, before displaying a frame of an image, which may be referred to as a to-be-displayed image, the display panel may detect the to-be-displayed image to determine sub-pixels included in each pixel row of the to-be-displayed image that have a grayscale value lower than the predetermined threshold, and the sub-pixels with a grayscale value lower than the predetermined threshold may be a red sub-pixel, a green sub-pixel, and a blue sub-pixel in the pixel row.

Exemplarily, during the image display process, the display panel may first acquire the to-be-displayed image, and then analyze each pixel row one by one starting from a first pixel row in the to-be-displayed image, and, when a grayscale value of a sub-pixel included in the pixel row is lower than the predetermined threshold, determine a coordinate of a light-emitting element for displaying the sub-pixel in the light-emitting element array and record the coordinate.

As shown in FIG. 1, when the sub-pixel is displayed by the light-emitting element 15 in the 2nd row and the 2nd column of the light-emitting element array, the coordinates (S2, G2) of the light-emitting element 15 in the light-emitting element array may be recorded, with S2 denoting that the light-emitting element 15 is located in the 2nd row of the light-emitting element array and G2 denoting that the light-emitting element 15 is located in the 2nd column of the light-emitting element array. Similarly, each pixel row may be detected to determine a sub-pixel with a low grayscale value in each pixel row, and coordinates of the light-emitting element used to display the sub-pixel with a low grayscale value in the light-emitting element array may be recorded.

In some embodiments, during displaying a pixel row, the display panel may detect if a coordinate corresponding to the pixel row is present from the pre-recorded one or more coordinates, and if yes, determine a sub-pixel included in the pixel row with a grayscale value lower than the predetermined threshold. For example, during displaying a 2nd pixel row in the image, firstly the row coordinate of the pixel row is determined to be S2, and coordinates corresponding to the row coordinate S2 in the plurality of pre-recorded coordinates are (S2, G1), (S2, G2), and (S2, G3), then it may be determined that a plurality of sub-pixels with a grayscale value lower than the predetermined threshold are present in the 2nd pixel row.

In other embodiments, before displaying each pixel row, the display panel may directly determine the grayscale values of sub-pixels included in the pixel row, and when the grayscale value of one or more sub-pixels is lower than a predetermined threshold, it is determined that the pixel row includes one or more sub-pixels with a grayscale value lower than the predetermined threshold.

S42: increasing, if yes, a voltage of a data line where the light-emitting element is located during displaying the pixel row.

The light-emitting element is configured to display a red sub-pixel of at least one sub-pixel.

In this embodiment, after determining that the pixel row to be displayed includes one or more sub-pixels having a grayscale value lower than the predetermined threshold, the display panel may, during displaying the pixel row, increase the voltage of the data line on which the light-emitting element for displaying the red sub-pixel of the pixel row having a grayscale value lower than the predetermined threshold is located.

As shown in FIG. 1, when it is determined that the 2nd pixel row includes at least one sub-pixel having a grayscale value lower than the predetermined threshold, it can be determined that the pixel row includes a red sub-pixel having a grayscale value lower than the predetermined threshold based on the pre-recorded coordinates (S2, G1), and that a light-emitting element corresponding to the red sub-pixel is located in the 1st column of the 2nd row in the light-emitting element array.

When displaying the 2nd pixel row, the display panel may increase the voltage of the data line Data1, namely increase the cathode voltage of the red light-emitting element 14. As the cathode voltage of the light-emitting element 14 is increased, the voltage difference between the positive and negative terminals of the light-emitting element 14 is decreased, which will cause the brightness of the light-emitting element 14 to reduce.

In the light-emitting element array, the light-emitting elements of different colors are arranged according to a fixed arrangement pattern. For example, the red light-emitting elements, the green light-emitting elements, and the blue light-emitting elements in the display unit shown in FIG. 1 are arranged sequentially from left to right. Thus, the light-emitting elements in the 1st, 4th, and 7th . . . columns in the light-emitting element array are red light-emitting elements. For another example, when the green light-emitting elements, the blue light-emitting elements, and the red light-emitting elements in the display unit are arranged sequentially from left to right, the light-emitting elements in the 3rd, 6th, and 9th . . . columns in the light-emitting element array are red light-emitting elements.

Similarly, when displaying the 2nd pixel row, when the grayscale value of the red sub-pixels located in the 4th and 7th columns in the 2nd pixel row is lower than the predetermined threshold, the voltage of the data line where the corresponding red light-emitting elements are located may be increased so that the brightness of the corresponding red light-emitting elements is reduced.

It is understood that the light-emitting element is in a conducted state when the voltage of the data line on which the light-emitting element is located is increased during displaying the pixel row, and at this point, the voltage of the reference signal on the data line on which the light-emitting element is located is increased when the light-emitting element is in the conducted state.

It is to be noted that during the display of the image, although the display panel displays each pixel row successively in a row-by-row manner, the display of the plurality of pixel rows in the display panel is perceived as simultaneous by the human eye due to a relatively fast display speed. In the image display process, when the brightness of the red light-emitting element corresponding to the red sub-pixel with a grayscale value lower than a predetermined threshold in each pixel row is reduced, the brightness of the red light-emitting element, the brightness of the green light-emitting element, and the brightness of the blue light-emitting element can be made similar or consistent, so that the problem of color deviation can be alleviated or solved.

In some embodiments, an increase in the voltage of the data line may be a predetermined voltage increment when increasing the voltage of the data line. The predetermined voltage increment is used to decrease the brightness of the red light-emitting element by a certain magnitude so that the brightness of the red light-emitting element is close to or consistent with the brightness of the blue light-emitting element and the green light-emitting element. The predetermined voltage increment can be specifically set according to the demand and is not limited in the present embodiment.

Optionally, S42 may include:

determining a first voltage increment based on the grayscale value of the at least one sub-pixel; and increasing the voltage of the data line on which the light-emitting element is located according to the first voltage increment.

In some embodiments, a relationship curve between the grayscale value of a sub-pixel and the voltage increment may be pre-established, and when it is determined that the voltage of the data line needs to be increased, a corresponding first voltage increment may be determined from the relationship curve according to the grayscale value of the at least one sub-pixel having a grayscale value lower than the predetermined threshold, and the voltage of the data line may be increased based on the first voltage increment.

For example, in the development process of a display panel, the display panel may be controlled to display a test image in which the grayscale value of a sub-pixel in the test image is 49. At this time, the voltage of the data line where the red light-emitting element is located is increased, so that the brightness of the red light-emitting element, the green light-emitting element, and the blue light-emitting element is similar or the same, and a voltage increment at this point, $\Delta V1$, is recorded.

Similarly, the display panel is controlled to display another test image in which the grayscale value of a sub-pixel in the test image is 48, the voltage of the data line where the red light-emitting element is located is increased so that the brightness of the red light-emitting element, the green light-emitting element, and the blue light-emitting element is similar or remains the same, and a voltage increment at this time, $\Delta V2$, is recorded.

Analogously, a voltage increment for grayscale values of 49, 48, 47, and 46 . . . can be determined, respectively, and then a relationship curve is obtained by fitting of the plurality of grayscale values and voltage increments.

When determining the voltage increment corresponding to different grayscale values, it is also possible to set the grayscale values for only part of the sub-pixels in the test image, and determine the corresponding plurality of grayscale values and voltage increments based on the grayscale values of the part of the sub-pixels.

In some embodiments, during the display of the image, if it is determined that the pixel row includes at least one sub-pixel with a grayscale value lower than the predetermined threshold, an average grayscale value may be calculated based on the grayscale value of each sub-pixel with a grayscale value lower than the predetermined threshold. Then, a corresponding voltage increment is obtained from the relationship curve according to the average grayscale value, which is a first voltage increment.

For example, when the average grayscale value is calculated to be 48, a voltage increment $\Delta V2$ corresponding to the average grayscale value 48 can be determined from the relationship curve according to the average grayscale value 48. At this point, the voltage of the data line where the red light-emitting element is located can be increased by $\Delta V2$ when increasing the voltage of the data line.

Alternatively, each grayscale value 49, 48, 47, and 46 may be stored during the testing process, and the voltage increment corresponding to each grayscale value may be stored, respectively. During display of the pixel row, an average grayscale value (e.g., 48.6) of the at least one sub-pixel with a grayscale value below the predetermined threshold may be calculated. Then, a grayscale value closest to the average grayscale value is determined from the plurality of pre-stored grayscale values, and the voltage increment corresponding to that grayscale value is determined to be the first voltage increment. The voltage of the data line where the red light-emitting element is located may be increased by the first voltage increment when increasing the voltage of the data line.

The above are only exemplary examples, and the method of determining the first voltage increment based on the grayscale value of the at least one sub-pixel may include, but is not limited to, the above examples.

In the embodiments of the present application, during the display of a pixel row, by determining a voltage increment based on a grayscale value of at least one sub-pixel with a grayscale value lower than a predetermined threshold and increasing a voltage of a data line based on the voltage increment, the voltage increment of the data line can be matched with the grayscale value of the sub-pixel, so as to make the brightness of different light-emitting elements to be similar or consistent.

Figure 5:
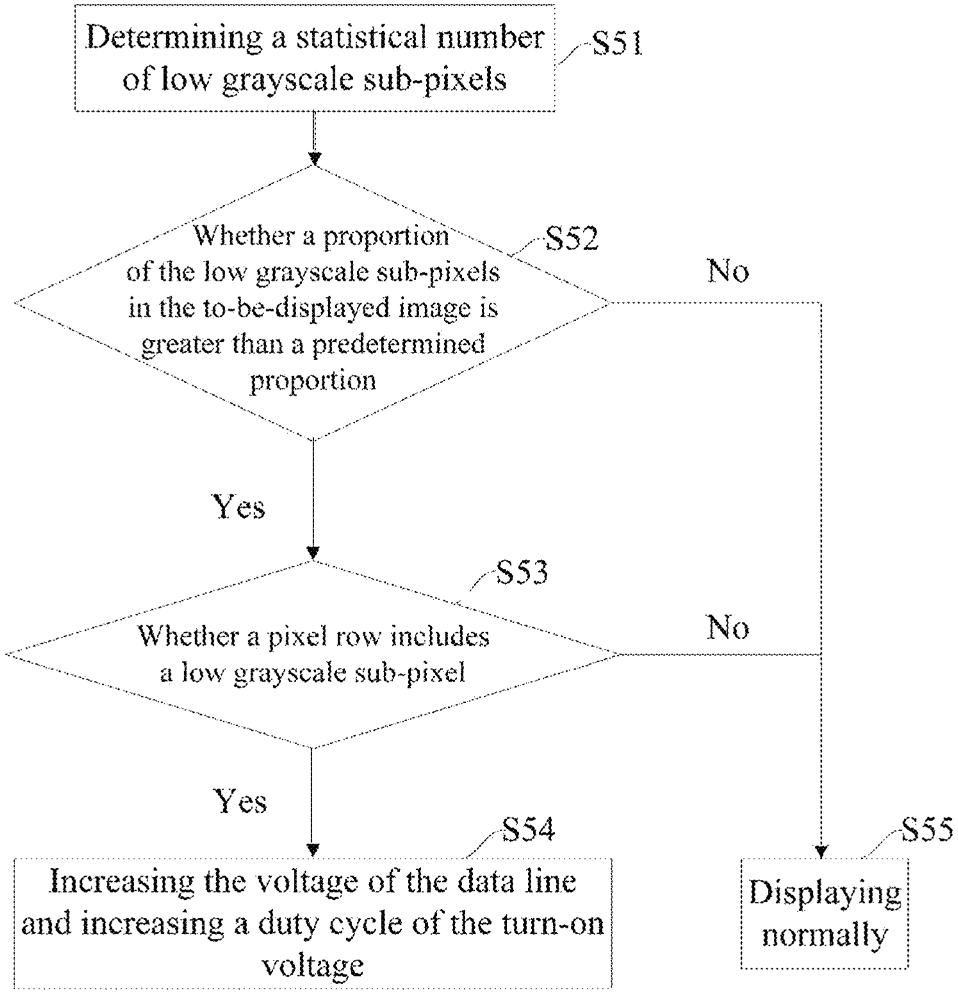
FIG. 5 is a flowchart of steps of another display method provided by an embodiment of the present application.

FIG. 5 is a flowchart of steps of another display method provided by an embodiment of the present application. The method may be performed by a display panel, as shown in FIG. 5, the method may include steps S51 to S54.

S51: determining a statistical number of low grayscale sub-pixels.

S52: determining whether a proportion of the low grayscale sub-pixels in the to-be-displayed image is greater than a predetermined proportion.

In some embodiments, before displaying the to-be-displayed image, the display panel may count the sub-pixels with a grayscale value lower than a predetermined threshold in the to-be-displayed image to obtain a statistical number, and determine whether the proportion of the statistical number in the number of total sub-pixels in the to-be-displayed image is greater than a predetermined proportion, and execute S53 when the proportion is greater than the predetermined proportion, and execute S55 when the proportion is less than or equal to the predetermined proportion.

In one embodiment, before displaying the to-be-displayed image, the display panel first determines each sub-pixel with a grayscale value lower than the predetermined threshold included in the to-be-displayed image, including red sub-pixels, green sub-pixels, and blue sub-pixels whose grayscale values are lower than the predetermined threshold. Then, the number of the sub-pixels with a grayscale value lower than the predetermined threshold is counted to determine a statistical number.

In another embodiment, when counting the sub-pixels having a grayscale value below the predetermined threshold in the to-be-displayed image, at least one low grayscale region may first be determined from the to-be-displayed image. The low grayscale region consists of a plurality of consecutive sub-pixels that are no less than a predetermined number having a grayscale value below the predetermined threshold, and then the statistical number is determined based on the number of sub-pixels contained in each low grayscale region.

Exemplarily, the predetermined number is 100, and the predetermined threshold is 50. The display panel may detect the sub-pixels in the to-be-displayed image in a column-by-column manner, and when detecting a column of sub-pixels, the grayscale value of each sub-pixel is detected sequentially starting from the first sub-pixel in the column, and when the grayscale values of the Nth (N is an integer greater than 0) to the Mth (M is an integer greater than 0) sub-pixels in the column are all less than 50, and (M−N+1) is greater than or equal to 100, it can be determined that the Nth to the Mth sub-pixels in the column constitute a low grayscale region. Analogously, each low grayscale region in the to-be-displayed image can be determined.

Exemplarily, the display panel may also detect the sub-pixels in the to-be-displayed image in a row-by-row manner, and when detecting a row of sub-pixels, the grayscale value of each sub-pixel is detected sequentially starting from the first sub-pixel in the row, and when the grayscale value of the Nth to the Mth sub-pixels in the row is lower than 50, and (M−N+1) is greater than or equal to 100, it can be determined that the Nth to the Mth sub-pixels in the sub-pixel row constitute a low grayscale region. Analogously, each low grayscale region in the to-be-displayed image can be determined.

After determining that the to-be-displayed image includes one or more low grayscale regions, the number of the sub-pixels included in each low grayscale region may be calculated, and the number of sub-pixels included in all low grayscale regions may be counted to obtain a statistical number of sub-pixels having a grayscale value lower than the predetermined threshold in the to-be-displayed image.

The above are only exemplary examples, and the method of counting the sub-pixels having a grayscale value lower than the predetermined threshold in the image may include, but is not limited to, the above examples.

It is understood that in an image, when the number of the sub-pixels having a grayscale value lower than the predetermined threshold is small and the sub-pixels are not continuously present in the image, the color deviation generally cannot be perceived by the human eye, in this case, the problem of the color deviation in the display panel does not need to be solved.

In an embodiment of the present application, when counting the sub-pixels having a grayscale value lower than the predetermined threshold in the image, only the number of the sub-pixels in a low grayscale region in the image is counted, so that low grayscale sub-pixels in the image that have no or small effect on the color deviation can be excluded, the statistical number of the low grayscale sub-pixels can be lowered, and the number of times the display panel has to solve the color deviation problem can be lowered, which can in turn reduce the power consumption of the display panel.

S53: determining whether a pixel row includes a sub-pixel with a grayscale value below a predetermined threshold.

In the present embodiment, after determining that the proportion of the low grayscale sub-pixels in the to-be-displayed image is greater than the predetermined proportion, when displaying each pixel row in the to-be-displayed image, it may be determined whether the pixel row to be displayed includes at least one sub-pixel with a grayscale value lower than the predetermined threshold, and step 54 is executed when the pixel row to be displayed includes a low grayscale sub-pixel, and step 55 is executed when the pixel row to be displayed does not include a low grayscale sub-pixel.

S54: increasing the voltage of the data line on which the light-emitting element is located and increasing a duty cycle of the turn-on voltage.

The light-emitting element is a red light-emitting element for displaying a red sub-pixel with a grayscale value lower than the predetermined threshold.

In some embodiments, during displaying a pixel row, when it is determined that the pixel row includes at least one sub-pixel with a grayscale value lower than the predetermined threshold, the display panel may increase the voltage of the data line where the light-emitting element corresponding to a red sub-pixel in the at least one sub-pixel is located, and may also increase a duty cycle of the turn-on voltage inputted into the scanning line on which the light-emitting element is located, in order to increase a conduction duration of the red light-emitting element.

As shown in FIG. 1, during the process of displaying the 2nd pixel row in the to-be-displayed image, if it is determined that a sub-pixel having a grayscale value lower than the predetermined threshold exists in the 2nd pixel row, and a red sub-pixel located in the 1st column has a grayscale value lower than the predetermined threshold, the duty cycle of the turn-on voltage inputted to the scan line Scan2 may be increased while increasing the voltage on the data line Data1, where the duty cycle of the turn-on voltage is the duty cycle of the turn-on voltage in the switch signal. As shown in FIG. 2, the turn-on voltage is at a high level of 5 V. When the duty cycle of the turn-on voltage is increased, the conduction duration of the light-emitting elements in the 2nd row is increased. Due to the increase in conduction duration, the brightness of the light-emitting elements in row 2 increases.

In other embodiments, when increasing the voltage of the data line on which the light-emitting element for displaying the red sub-pixel is located, the voltage value of the turn-on voltage may also be increased. As shown in FIG. 2, while increasing the voltage on the data line Data1, the voltage value of the turn-on voltage may be increased to higher than 5 V. When the voltage value of the turn-on voltage is increased, the anode voltage of the light-emitting elements in the 2nd row increases, which causes the brightness of the light-emitting elements in the 2nd row to increase.

It should be noted that when increasing the voltage on the data line Data1, both or only one of the voltage value and the duty cycle of the turn-on voltage may be increased simultaneously, to increase the brightness of the light-emitting elements in the 2nd row.

S55: displaying normally.

In the present embodiment, when a proportion of the low grayscale sub-pixels in the to-be-displayed image is less than or equal to the predetermined proportion, the display panel can normally display each pixel row in the to-be-displayed image. Similarly, when the proportion of the low grayscale sub-pixels in the to-be-displayed image is greater than the predetermined proportion, and the pixel row does not include sub-pixels with a grayscale value lower than the predetermined thresholds, the display panel can normally display the pixel row to be displayed. During a normal display, the display panel does not increase the voltage of the data line, nor does it increase the duty cycle and voltage value of the turn-on voltage.

Optionally, the step of increasing the duty cycle of the turn-on voltage may include:

- determining a duty cycle increment based on the grayscale value of the at least one sub-pixel; and
- increasing the duty cycle of the turn-on voltage according to the duty cycle increment.

In some embodiments, a relationship curve between the grayscale value of the sub-pixels and the duty cycle increment may be pre-established, and when increasing the duty cycle of the turn-on voltage, a corresponding duty cycle increment may be determined from a plurality of pre-stored duty cycle increments based on the grayscale values of the sub-pixels.

Exemplarily, during the research and development of the display panel, if it is desired that the grayscale value of the light-emitting element in the display panel is no less than a target grayscale value (e.g., 50), the display panel can be controlled to display a test image, and the grayscale value of the sub-pixels included in the test image is 49. Now, firstly, the duty cycle of the turn-on voltage is increased, so that the grayscale value of the sub-pixels displayed by the green light-emitting element and the blue light-emitting element in the display panel reaches 50, and a duty cycle increment, ΔD1, of the turn-on voltage is recorded. Then, the voltage of a data line where the red light-emitting element is located is increased so that the grayscale value of the red sub-pixel displayed by the red light-emitting element reaches 50, and a voltage increment, ΔV1, of the data line at this point is recorded.

Similarly, the display panel is controlled to display a test image, and the grayscale value of the sub-pixels included in the test image is 49. Firstly, the duty cycle of the scanning line where the pixel row is located is increased, so that the grayscale value of the sub-pixels displayed by the green light-emitting element and the blue light-emitting element reaches 50, and a duty cycle increment, ΔD2, of the turn-on voltage at this point is recorded. Then, the voltage of a data line where the red light-emitting element is located is reduced so that the grayscale value of the red sub-pixel displayed by the red light-emitting element reaches 50, and a voltage increment, ΔV2, of the data line at this point is recorded. Analogously, the voltage increment and the duty cycle increment with a grayscale value of 49, 48, 47, 46 . . . can be determined, respectively.

After determining the voltage increment and the duty cycle increment when the grayscale value is 49, 48, 47, 46 . . . respectively, a relationship curve between the grayscale value, the voltage increment and the duty cycle increment may be established. During the display of the image, the display panel, after determining that the pixel row includes at least one sub-pixel with a grayscale value lower than a predetermined threshold, may carry out a calculation to determine an average grayscale value of the at least one sub-pixel. Then, based on the average grayscale value, a corresponding duty cycle increment and a first voltage increment are determined through the relationship curve, and the duty cycle of the turn-on voltage is increased by the duty cycle increment, and the voltage of the data line is increased by the first voltage increment.

Alternatively, each grayscale value during the test may be stored, and the voltage increment and duty cycle increment corresponding to each grayscale value, respectively, may be stored. During the display of the pixel row, an average grayscale value (e.g., 48.6) of at least one sub-pixel with a grayscale value below a predetermined threshold may be calculated. Then, a grayscale value closest to the average grayscale value is determined from the plurality of pre-stored grayscale values, and a voltage increment corresponding to that grayscale value is determined to be a first voltage increment, and a duty cycle increment corresponding to that grayscale value is determined to be a desired duty cycle increment, and then the voltage on the data line on which the red light-emitting element is located is increased by the first voltage increment, and the duty cycle of the turn-on voltage is increased by the duty cycle increment.

In an embodiment of the present application, during the display of the pixel row, by determining the duty cycle increment based on the grayscale value of at least one sub-pixel with a grayscale value lower than the predetermined threshold value and increasing the turn-on voltage according to the duty cycle increment, the grayscale of the sub-pixel displayed in the display panel can reach a target grayscale value, so that the problem of color deviation can be solved more precisely.

In an embodiment of the present application, when the proportion of low grayscale sub-pixels in an image is greater than the predetermined proportion, during the display of a pixel row of the image, increasing the duty cycle of the turn-on voltage can increase the brightness of the light-emitting element increase at the same time, and increasing the voltage of the data line can reduce the brightness of the red light-emitting element so that the brightness of the red light-emitting element is close to or consistent with the brightness of the green light-emitting element and the blue light-emitting element, so that the color deviation can be alleviated and the brightness of light-emitting elements of different colors can be kept similar or the same.

The display method shown in FIGS. 4 and 5 may be specifically executed by a timing controller in the display panel. The timing controller includes an over driving (OD) module, the to-be-displayed image may be stored in the OD, and the timing controller may obtain the to-be-displayed image from the OD to execute the display method shown in FIGS. 4 and 5.

Figure 6:
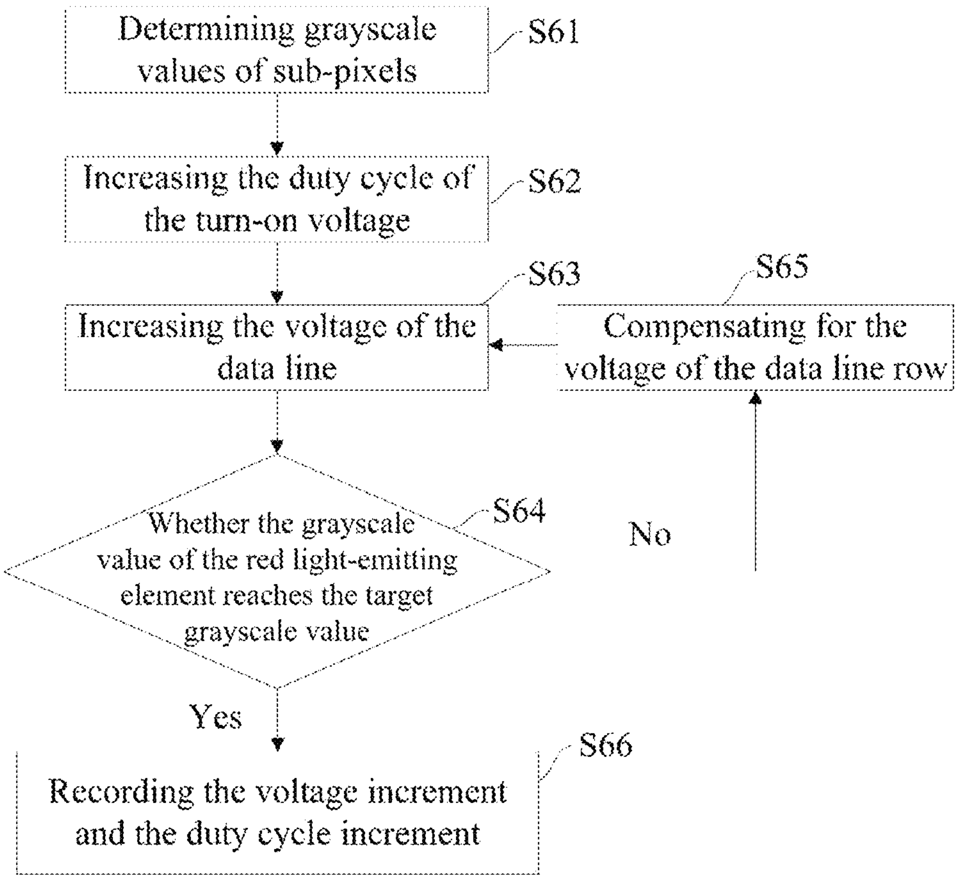
FIG. 6 is a schematic diagram of a parameter rectification process provided by an embodiment of the present application.

FIG. 6 is a schematic diagram of a parameter rectification process provided by an embodiment of the present application. As shown in FIG. 6, establishing the relationship curve may include steps S61 to S66.

S61: displaying a test image by the display panel and determining grayscale values of sub-pixels in the test image. The grayscale value of the sub-pixels in the test image is lower than the target grayscale value, and the grayscale value of the sub-pixels in the test image is, for example, 49.

S62: increasing the duty cycle of the turn-on voltage so that the grayscale value of the green light-emitting element and the blue light-emitting element reach the target grayscale value.

The grayscale value of the green light-emitting element is the grayscale value of the green sub-pixel displayed by the green light-emitting element, and the grayscale value of the blue light-emitting element is the grayscale value of the blue sub-pixel displayed by the blue light-emitting element.

S63: increasing the voltage of the data line on which the red light-emitting element is located, and using the increased value of the voltage of the data line as the voltage increment.

S64: determining, after increasing the voltage of the data line on which the red light-emitting element is located, whether the grayscale value of the red light-emitting element reaches the target grayscale value. S66 is performed if the grayscale value of the red light-emitting element reaches the target grayscale value, and S65 is performed if the grayscale value of the red light-emitting element does not reach the target grayscale value.

For example, after increasing the voltage of the data line, it can be determined whether the grayscale value of the red light-emitting element reaches the target grayscale value by taking a picture of the image displayed by the display panel with a charge-coupled device (CCD) camera. The grayscale value of the red light-emitting element is the grayscale value of the red sub-pixel displayed by the red light-emitting element.

S65: compensating for the voltage of the data line by increasing the voltage of the data line again and using the increased value of the voltage of the data line as a compensation voltage.

S66: recording the voltage increment and the duty cycle increment. When the voltage of the data line is not compensated, only the voltage increment and the duty cycle increment are recorded to obtain the duty cycle increment and the voltage increment corresponding to the grayscale value of 49. When the voltage of the data line is compensated, the recorded voltage increment and the compensation voltage may be summed to obtain a new voltage increment, and the new voltage increment is used as the voltage increment corresponding to the grayscale value of 49.

Alternatively, the voltage increment, the duty cycle increment, and the compensation voltage may be recorded at the same time. In determining a first voltage increment based on the average grayscale value, the voltage increment and the compensation voltage corresponding to the average grayscale value may be determined, and the voltage increment and the compensation voltage may be summed to obtain the first voltage increment.

Optionally, the step of increasing the voltage value of the turn-on voltage may include:

determining a second voltage increment based on the grayscale value of the at least one sub-pixel; and increasing the voltage value of the turn-on voltage according to the second voltage increment.

In some embodiments, a relationship curve between the grayscale value of a sub-pixel and the voltage increment of the turn-on voltage may be pre-established, and when increasing the voltage value of the turn-on voltage, a corresponding voltage increment may be determined from the plurality of pre-stored voltage increments based on the grayscale value of the at least one sub-pixel having a grayscale value lower than the pre-determined threshold, which is a second voltage increment. The specific process of determining the second voltage increment based on the grayscale value of the at least one sub-pixel can be referred to the process of determining the duty cycle increment and the first voltage increment, and will not be repeated herein.

Figure 7:
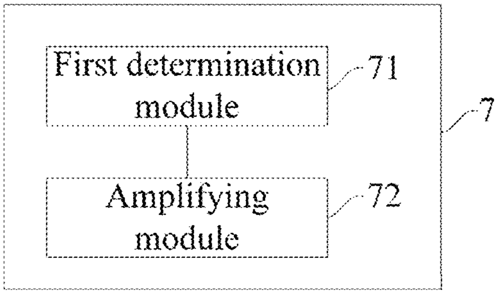
FIG. 7 is a schematic diagram of a structure of a display panel provided by an embodiment of the present application.

FIG. 7 is a schematic structure view of a display panel provided by an embodiment of the present application. As shown in FIG. 7, a first determination module 71 and an amplifying module 72 may be included in the display panel 7.

The first determination module 71 is configured for determining whether the pixel row to be displayed includes at least one sub-pixel with a grayscale value below a predetermined threshold;

The amplifying module 72 is configured for, if yes, increasing a voltage of a data line on which a light-emitting element is located during the display of the pixel row, the light-emitting element is used to display a red sub-pixel of the at least one sub-pixel.

In some embodiments, the amplifying module is further configured to increase the duty cycle and/or the voltage value of the turn-on voltage, the turn-on voltage is the turn-on voltage of the scan line where the input light-emitting element is located.

In some embodiments, the amplifying module 72 includes:

a determination unit for determining a first voltage increment based on the grayscale value of the at least one sub-pixel;

an amplifying unit for increasing the voltage of the data line on which the light-emitting element is located according to the first voltage increment.

In some embodiments, the amplifying module 72 includes:

a determination unit for determining a duty cycle increment based on the grayscale value of the at least one sub-pixel;

an amplifying unit for increasing the duty cycle of the turn-on voltage according to the duty cycle increment.

In some embodiments, the amplifying module 72 includes:

a determination unit for determining a second voltage increment based on the grayscale value of the at least one sub-pixel;

an amplifying unit for increasing a voltage value of the turn-on voltage according to the second voltage increment.

In some embodiments, the pixel row is a row of pixels in the to-be-displayed image, and the display panel 7 further includes:

a statistics module for counting sub-pixels in the to-be-displayed image with a grayscale value lower than the predetermined threshold to obtain a statistical number;

a second determination module for determining whether a proportion of the statistical number in the number of sub-pixels of the to-be-displayed image is greater than a predetermined proportion.

In some embodiments, the statistics module is specifically used to determine at least one low grayscale region from the to-be-displayed image, the low grayscale region includes a plurality of consecutive sub-pixels no less than a predetermined number which have a grayscale value lower than the predetermined threshold; the statistical number is determined based on the number of sub-pixels contained in each low grayscale region.

An embodiment of the present application also provides a readable storage medium, the readable storage medium stores a computer program, which, when executed by a processor, implements the above-mentioned display method. The processor is for example a timing controller as in the above example. The processor is for example a timing controller in a display panel.

The above-described embodiments are only used to illustrate the technical proposals of the present application, not to limit the present application; although the present application has been described in detail with reference to the foregoing embodiments, a person of ordinary skill in the art should understand that it is still possible to make modifications to the technical proposals described in the foregoing embodiments, or to make equivalent substitutions for some of the technical features therein; and such modifications or substitutions do not make the essence of the corresponding technical proposals depart from the spirit and scope of the technical proposals of the various embodiments of the present application, and shall be included in the scope of protection of the present application.

What is claimed is:

1. A display method, comprising:

determining whether a pixel row to be displayed comprises at least one sub-pixel with a grayscale value below a predetermined threshold; and increasing, when the pixel row to be displayed comprises at least one sub-pixel with the grayscale value below the predetermined threshold, a voltage of a data line on which a light-emitting element is located when displaying the pixel row, the light-emitting element being configured to display a red sub-pixel of the at least one sub-pixel.

2. The display method according to claim 1, further comprising:

increasing a duty cycle of a turn-on voltage and/or increasing a voltage value of the turn-on voltage, the turn-on voltage being a turn-on voltage inputted to a scan line on which the light-emitting element is located.

3. The display method according to claim 2, wherein the step of increasing the duty cycle of the turn-on voltage comprises:

determining a duty cycle increment based on the grayscale value of the at least one sub-pixel; and increasing the duty cycle of the turn-on voltage according to the duty cycle increment.

4. The display method according to claim 2, wherein the step of increasing the voltage value of the turn-on voltage comprises:

determining a second voltage increment based on the grayscale value of the at least one sub-pixel; and increasing the voltage value of the turn-on voltage according to the second voltage increment.

5. The display method according to claim 1, wherein the step of increasing the voltage of the data line on which the light-emitting element is located comprises:

determining a first voltage increment based on the grayscale value of the at least one sub-pixel; and increasing the voltage of the data line on which the light-emitting element is located according to the first voltage increment.

6. The display method according to claim 1, wherein the pixel row is a pixel row in a to-be-displayed image, and before the step of determining whether the pixel row to be displayed comprises at least one sub-pixel with the grayscale value below the predetermined threshold, the method further comprises:

counting sub-pixels with the grayscale value below the predetermined threshold to obtain a statistical number in the to-be-displayed image; and determining that a proportion of the statistical number in the number of total sub-pixels in the to-be-displayed image is greater than a predetermined proportion.

7. The display method according to claim 6, further comprising:

increasing a duty cycle of a turn-on voltage and/or increasing a voltage value of the turn-on voltage, the turn-on voltage being a turn-on voltage inputted to a scan line on which the light-emitting element is located.

8. The display method according to claim 7, wherein the step of increasing the duty cycle of the turn-on voltage comprises:

determining a duty cycle increment based on the grayscale value of the at least one sub-pixel; and increasing the duty cycle of the turn-on voltage according to the duty cycle increment.

9. The display method according to claim 7, wherein the step of increasing the voltage value of the turn-on voltage comprises:

determining a second voltage increment based on the grayscale value of the at least one sub-pixel; and increasing the voltage value of the turn-on voltage according to the second voltage increment.

10. The display method according to claim 6, wherein the step of counting the sub-pixels with the grayscale value below the predetermined threshold in the to-be-displayed image to obtain the statistical number comprises:

determining at least one low grayscale region from the to-be-displayed image, the low grayscale region consists of a plurality of consecutive sub-pixels having a grayscale value below the predetermined threshold, the number of the plurality of consecutive sub-pixels is no less than a predetermined number; and determining the statistical number based on the number of sub-pixels comprised in each low grayscale region.

11. The display method according to claim 6, wherein the step of increasing the voltage of the data line on which the light-emitting element is located comprises:

determining a first voltage increment based on the grayscale value of the at least one sub-pixel; and increasing the voltage of the data line on which the light-emitting element is located according to the first voltage increment.

12. A non-transitory computer readable storage medium, wherein the non-transitory computer readable storage medium stores a computer program, which, when executed by a processor, cause the processor to implement the method according to claim 1.

13. A display panel, comprising:

a first determination module configured for determining whether a pixel row to be displayed comprises at least one sub-pixel with a grayscale value below a predetermined threshold; and an amplifying module configured for, when the pixel row to be displayed comprises at least one sub-pixel with the grayscale value below the predetermined threshold, increasing a voltage of a data line on which a light-emitting element is located during displaying the pixel row, the light-emitting element being configured to display a red sub-pixel of the at least one sub-pixel.

14. The display panel according to claim 13, wherein the amplifying module is further configured for increasing a duty cycle of a turn-on voltage and/or a voltage value of the turn-on voltage, the turn-on voltage being a turn-on voltage inputted to a scan line on which the light-emitting element is located.

15. The display panel according to claim 14, wherein the amplifying module comprises:

a determination unit configured for determining a duty cycle increment based on the grayscale value of the at least one sub-pixel; and an amplifying unit configured for increasing the duty cycle of the turn-on voltage according to the duty cycle increment.

16. The display panel according to claim 14, wherein the amplifying module comprises:

a determination unit configured for determining a second voltage increment based on the grayscale value of the at least one sub-pixel; and an amplifying unit configured for increasing the voltage value of the turn-on voltage according to the second voltage increment.

17. The display panel according to claim 13, wherein the amplifying module comprises:

a determination unit configured for determining a first voltage increment based on the grayscale value of the at least one sub-pixel; and an amplifying unit configured for increasing the voltage of the data line on which the light-emitting element is located according to the first voltage increment.

18. The display panel according to claim 13, wherein the pixel row is a row of pixels in a to-be-displayed image, and the display panel further comprises:

a statistics module configured for counting sub-pixels in the to-be-displayed image having a grayscale value below a predetermined threshold to obtain a statistical number; and a second determination module configured for determining that a proportion of the statistical number in the number of total sub-pixels in the to-be-displayed image is greater than a predetermined proportion.

19. The display panel according to claim 18, wherein the amplifying module is further configured for increasing a duty cycle of a turn-on voltage and/or a voltage value of the turn-on voltage, the turn-on voltage being a turn-on voltage inputted to a scan line on which the light-emitting element is located.

20. The display panel according to claim 18, wherein the statistics module is configured for determining at least one low grayscale region from the to-be-displayed image, the low grayscale region consists of a plurality of consecutive sub-pixels having a grayscale value lower than the predetermined threshold, the number of the plurality of consecutive sub-pixels being no less than a predetermined number; and determining the statistical number based on the number of sub-pixels comprised in each low grayscale region.

* * * * *